US005942985A

United States Patent [19]

Chin

[11] Patent Number: 5,942,985

[45] Date of Patent: Aug. 24, 1999

[54] AUTOMATIC LOCKING/UNLOCKING DEVICE AND METHOD USING WIRELESS COMMUNICATION

[75] Inventor: Seo-Yong Chin, Seongnam, Rep. of Korea

[73] Assignee: Samsung Electronics Co., Ltd., Suwon, Rep. of Korea

[21] Appl. No.: 08/685,405

[22] Filed: Jul. 24, 1996

[30] Foreign Application Priority Data

Jul. 25, 1995 [KR] Rep. of Korea ...................... 95-22062

[51] Int. Cl.[6] ........................................ G06F 7/04

[52] U.S. Cl. ............................... 340/825.31; 340/825.54; 340/825.69

[58] Field of Search .............................. 340/825.31, 528, 340/825.54, 825.69; 70/277, 280

[56] References Cited

U.S. PATENT DOCUMENTS

| | | | |
|---|---|---|---|
| 4,189,712 | 2/1980 | Lemelson | 340/825.31 |
| 4,670,746 | 6/1987 | Taniguchi et al. | 340/825.31 |
| 4,677,284 | 6/1987 | Genest | 340/825.31 |
| 4,763,121 | 8/1988 | Tomoda et al. | 340/825.54 |
| 4,794,268 | 12/1988 | Nakano et al. | 340/825.31 |
| 4,809,199 | 2/1989 | Burgess et al. | 340/825.31 |
| 4,897,644 | 1/1990 | Hirano | 340/825.31 |
| 5,109,221 | 4/1992 | Lambropoulos et al. | 340/825.31 |
| 5,134,392 | 7/1992 | Takeuchi et al. | 340/825.31 |
| 5,204,663 | 4/1993 | Lee | 340/825.31 |
| 5,319,364 | 6/1994 | Waraksa et al. | 340/825.31 |
| 5,379,033 | 1/1995 | Fujii et al. | 340/825.69 |
| 5,451,934 | 9/1995 | Dawson et al. | 340/825.31 |
| 5,677,672 | 10/1997 | Vogt et al. | 340/528 |
| 5,712,626 | 1/1998 | Andreou et al. | 340/825.69 |

*Primary Examiner*—Edwin C. Holloway, III
*Assistant Examiner*—Edward Merz

[57] ABSTRACT

An automatic locking/unlocking device has a wireless lock device which includes a lock, a first memory for storing a lock controlling code, a first transmitter for transmitting a wireless transmission signal, a first receiver for receiving a wireless reception signal, a lock control circuit for generating a pilot signal by controlling the first transmitter, for comparing a lock access code included in the wireless reception signal with the lock controlling code when the wireless reception signal is received, releasing the locking function of the lock if the lock access code is identical to the lock controlling code, and locking the lock after a predetermined time has elapsed; and a wireless key device which includes a second memory for storing the lock access code, a second transmitter for transmitting the wireless reception signal, a second receiver for receiving the pilot signal, and a key control circuit for transmitting the lock access code when the pilot signal is received. The wireless lock device substantially continuously outputs the pilot signal in an idle state, and the lock controlling code is automatically transmitted when the wireless key device gets within a predetermined distance to receive the pilot signal.

12 Claims, 3 Drawing Sheets

AUTOMATIC LOCKING/UNLOCKING DEVICE AND METHOD USING WIRELESS COMMUNICATION

BACKGROUND OF THE INVENTION

1. Field of the Invention

The present invention relates to an automatic locking/unlocking device and method, and more particularly to an automatic locking/unlocking device having a wireless lock device equipped with a locking/unlocking control function and a wireless key device for performing wireless communication with the wireless lock device, for performing locking and unlocking functions automatically, and method of use thereof.

An automatic locking/unlocking device and method using wireless communication according to the present invention is based on Korean Application Serial No. 22062/1995 which is incorporated herein by reference.

2. Description of the Related Art

Various kinds of keys and locks are widely used, such as keys and locks for an apartment, an office or an automobile. A user may need to carry many keys on his or her person and it may not be easy to find the proper key for locking or unlocking a specific lock. To solve such problems, electronic keys or card keys are under development. However, even when an electronic or card key is used, since the key should contact the corresponding lock directly, some manipulation may be required to be applied to the lock for locking or unlocking the lock.

SUMMARY OF THE INVENTION

Therefore, it is an object of the present invention to provide an automatic locking and unlocking device and method of use thereof, which can perform locking and unlocking functions using a wireless lock device and a wireless key device without requiring such wireless lock and key devices to be in physical contact with each other.

It is another object of the present invention to provide a locking/unlocking device including a wireless lock device and a wireless key device, which can control the wireless lock device automatically by performing wireless data communication when the wireless lock device gets relatively close to the wireless key device, and a method of use thereof.

To accomplish the above objects, a method is provided for controlling an automatic locking/unlocking device including a wireless lock device and a wireless key device, in which the method includes the steps of: transmitting a pilot signal in an idle state of the wireless lock device and waiting for reception of a wireless signal; transmitting a lock access code as the wireless signal when the wireless key device receives the pilot signal; comparing the received lock access code with a stored lock controlling code of the wireless lock device, and unlocking the locked state of the wireless lock device if the stored lock controlling code is identical to the received lock access code of the wireless key device, and otherwise returning to the pilot signal transmitting step; maintaining a communication state of the wireless lock device with the wireless key device if the wireless lock device is unlocked and maintaining an unlocked state for a predetermined time; and returning the wireless lock device to a locked state after the predetermined time, transmitting a return message to the wireless key device and then returning to the pilot signal transmitting step.

BRIEF DESCRIPTION OF THE DRAWINGS

The above objects and other advantages of the present invention will become more apparent by describing in detail preferred embodiments thereof with reference to the attached drawings in which.

DETAILED DESCRIPTION OF THE PREFERRED EMBODIMENT

Figure 1:
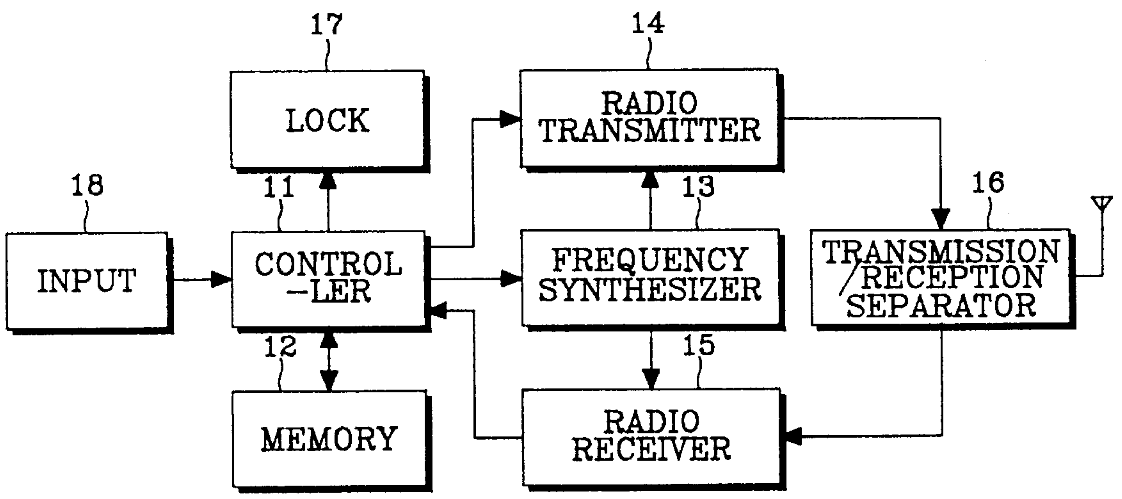
FIG. 1 is a block diagram of a wireless lock device according to the present invention.

As shown in an illustrative embodiment in FIG. 1, a lock controller 11 controls the overall operation of the wireless lock device. The lock controller 11 may include a microprocessor and a read only memory (ROM) for storing an operation controlling program of the wireless lock device and a random access memory (RAM) for temporarily storing data generated during program performance. A memory 12 has lock controlling codes (such as secret codes) for releasing the locked state of the wireless lock device. The number of lock controlling codes stored by the wireless lock device may correspond to as many as the number of wireless key devices. Otherwise, irrespective of the number of wireless key devices, a single lock controlling code may be implemented. For the memory 12, an electrically erasable and programmable read only memory (EEPROM) may be used. A frequency synthesizer 13 generates transmission and reception frequencies of the wireless lock device under the control of the lock controller 11. A transmitter 14 modulates control data supplied to the lock controller 11 to a transmission frequency which is output from the frequency synthesizer 13 and the transmitter 14 outputs the modulated control data as a wireless transmission signal. The control data may include a pilot code for generating a corresponding pilot signal, or lock controlling codes for generating corresponding lock controlling signals.

A receiver 15 demodulates a received wireless signal using a reception frequency output from the frequency synthesizer 13 and outputs the demodulated received wireless signal to the lock controller 11. Transmission/reception separator 16 transmits a wireless transmission signal supplied to the transmitter 14 via an antenna and provides a received wireless signal to the receiver 15. The lock 17 performs a locking or unlocking operation under the control of the lock controller 11. An input 18 generates an input signal for registering, changing and releasing the lock controlling codes and outputs the input signal to the lock controller 11. The input 18 may be signals specifying valid codes for locking and unlocking the lock 17.

Figure 2:
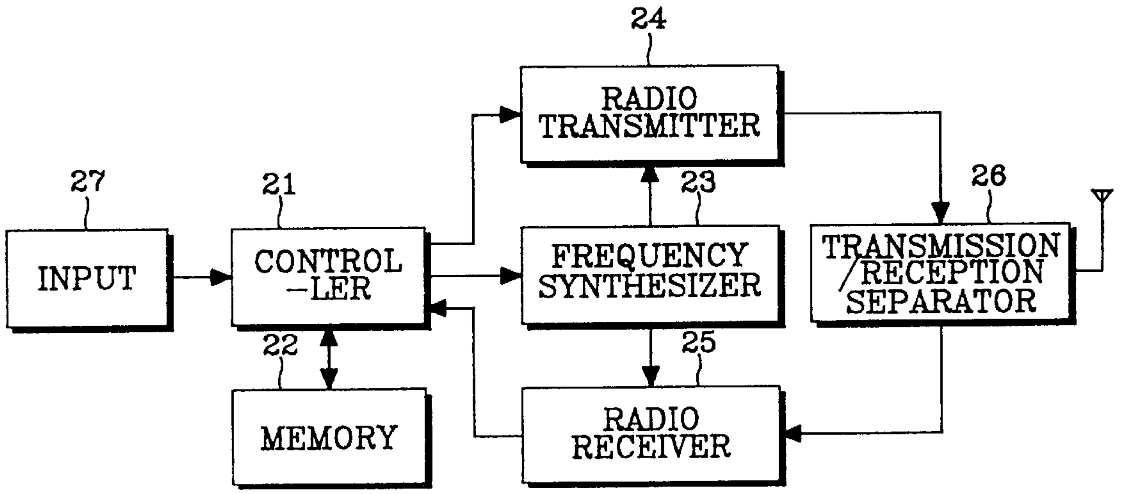
FIG. 2 is a block diagram of a wireless key device according to the present invention.

FIG. 2 is a block diagram of an illustrative embodiment of a wireless key device according to the present invention, in which a key controller 21 controls the overall operation of the wireless key device. The key controller 21 may include a microprocessor and a read only memory (ROM) for storing an operation controlling program of the wireless key device and a random access memory (RAM) for temporarily storing data generated during program performance. A memory 22 has lock access codes (such as secret codes) for releasing the locked state of the wireless lock device. The number of lock access codes stored by the wireless key device may correspond to as many as the number of wireless lock devices. Otherwise, irrespective of the number of wireless lock devices, a single lock access code may be implemented. For the memory 22, an electrically erasable and programmable read only memory (EEPROM) may be used. A frequency synthesizer 23 generates transmission and reception frequencies of the wireless key device under the control of the key controller 21. A transmitter 24 modulates control data supplied to the key controller 21 to a transmission frequency which is output from the frequency synthesizer 23 and the transmitter 24 outputs the modulated control data as a wireless transmission signal. A receiver 25 demodulates a received wireless signal using a reception frequency output from the frequency synthesizer 23 and outputs the demodulated received wireless signal to the key controller 21. Transmission/reception separator 26 transmits a wireless transmission signal supplied to the transmitter 24 via an antenna and provides a received wireless signal to the receiver 25. An input 27 generates an input signal for registering, changing and releasing the lock controlling codes and outputs the input signal to the key controller 21. The input 27 may be signals specifying valid codes for locking and unlocking the lock 17.

In the wireless lock device and wireless key device having the aforementioned illustrative embodiments, the transmitter 14 of the wireless lock device transmits a transmission signal as a pilot signal with relatively weak power to have a short range (e.g. about 1 meter). The lock controller 11 outputs control data for transmitting substantially continuously the pilot signal in an idle state so as to notify the presence and relative proximity of the wireless lock device. The type of pilot signal and modulating method used herein may be those signals and modulating methods typically used in the art for both the wireless lock device and the wireless key device. The modulating method may be any one of known analog modulating methods (FM, PM, etc.) or digital modulating methods (FSK, PSK, etc.), such that any method employed is mutually established for operation between the wireless lock device and wireless key device.

If the wireless key device is positioned within the transmission signal range of the wireless lock device (e.g. about 1 meter), the wireless key device should receive the pilot signal, so that the receiver 25 receives and demodulates the pilot signal and outputs the demodulated received pilot signal to the key controller 21. If the pilot signal is recognized as including a valid pilot code, the key controller 21 accesses the lock access codes stored in the memory 22 and outputs the stored lock access codes to the transmitter 24. Then, the transmitter 24 modulates and transmits the lock access codes to the wireless lock device as wireless signals.

The wireless signals are then received by the transmission/reception separator 16 and demodulated by the receiver 15 to extract the transmitted lock access codes. The wireless locking device enters a communication state with the wireless key device, and the lock controller 11 accesses the lock controlling codes stored in the memory 12 and compares the accessed lock controlling codes with the transmitted lock access codes. If any of the compared codes are identical, the lock controller 11 controls the lock 17 to release the lock 17 from a locked state and thus unlocks the lock 17. If none of the codes are identical, the communication state is cut off and a transition to the idle state is made by the wireless lock device to return to transmitting the pilot signal. As described above, if the lock 17 is controlled to be unlocked, the communication state with the wireless key device is maintained for a predetermined time. After the predetermined time has elapsed, the locking function is set again. The predetermined time allows for the releasing and resetting of the locking function of the wireless lock device and is divided into a first predetermined time T1, which is an elapsed time after the locking device is released, and a second predetermined time T2 which is an elapsed time after the communication with the wireless key device is cut off.

Figure 3:
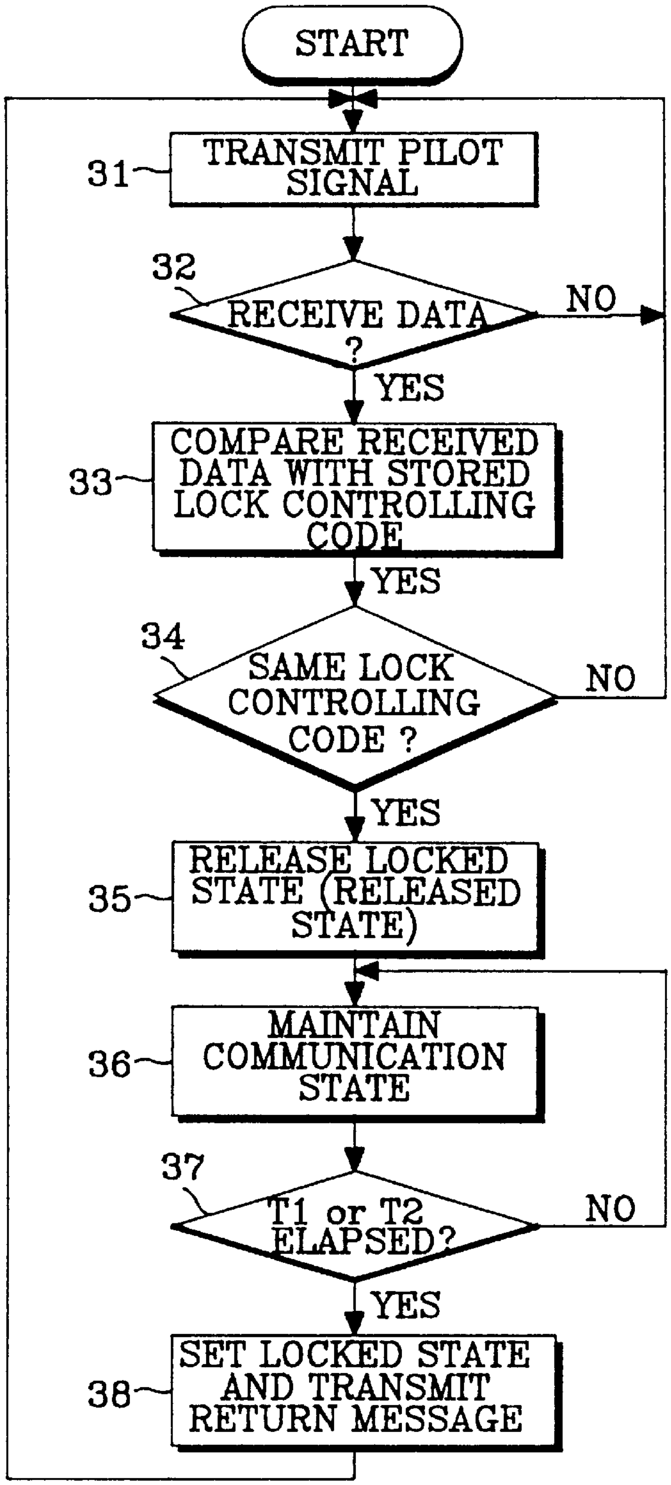
FIG. 3 is a flowchart illustrating the process of controlling an automatic locking or unlocking function of the wireless lock device through wireless communication between the wireless key device and the wireless lock device according to the present invention.

FIG. 3 illustrates an exemplary flowchart of the wireless lock device having the illustrative embodiment shown in FIG. 1, in which the lock controller 11 starts and enters an idle state after the power is turned on. During the idle state, the lock controller 11 outputs control data for generating the pilot signal using the transmitter 14 which modulates control data and transmits the pilot signal in step 31. At this time, the power of the pilot signal output from the transmitter 14 is relatively weak to limit the pilot signal transmission range to be about one meter. Such a limited range provides for operating the wireless lock device in a communication state with the wireless key device when the wireless key device is positioned relatively close to the wireless lock device.

As described above, the wireless lock device substantially continuously transmits the pilot signal in the idle state. The lock controller 11 checks in step 32 whether there is data received from the receiver 15. At this time, if there is no received data, the step 31 is repeatedly performed to transmit the pilot signal substantially continuously. However, in step 32, if there is received data, the memory 12 is accessed for at least one lock controlling code in step 33 to check whether the received data is identical to the lock controlling code. If the received data is not identical to the stored lock controlling code, the process returns to step 31 to repeatedly perform the pilot signal transmitting operation.

However, if the received data is identical to the stored lock controlling code, the lock controller 11 controls the lock 17 in step 36 to release the locking function of the lock 17. In other words, if it is detected that the wireless key device with a valid lock access code is substantially close to the corresponding wireless lock device within a predetermined distance, the wireless lock device releases the locking function of the lock automatically. At this time, after the lock controller 11 releases the locking function of the lock 17, the wireless lock device enters a lock release state and the communication state with the wireless key device is maintained in step 36. The maintenance of the communication state between the wireless lock and key devices is based on the matching of lock controlling and access codes. As described above, in the communication state in which the wireless lock and key devices are maintained, the lock controller 11 checks whether the first predetermined time T1 and the second predetermined time T2 have elapsed in step 37.

The first predetermined time Ti is the time for setting the release time of the locking function of the lock. After the lock 17 is unlocked and the first predetermined time T1 has elapsed, the lock 17 is automatically set to a locked state. During the first predetermined time T1, the wireless lock device and wireless key device maintain the communication state with each other. The first predetermined time T1 can be adjusted by the user as needed. Also, the second predetermined time T2 is the elapsed time after the communication state between the wireless lock device and wireless key device is cut off when the locking function of the lock is released. In other words, since the transmission range of the wireless lock device is limited, the communication state is cut off when the wireless key device moves away from the wireless lock device beyond the transmission range. In this case, the wireless lock device waits for the second predetermined time T2 and then sets again the lock 17 of the wireless lock device to a locked state.

Therefore, according to the wireless lock device of the present invention, if a predetermined time is elapsed in a state where the locking function of the lock 17 is released, the lock controller 11 detects the elapsed time in step 37. In step 38, the locked state is restored automatically, a return message is output to the transmitter 14 and then the process loops back to step 31.

As described above, the wireless lock device transmits a pilot signal continuously in an idle state and waits until a wireless key device gets close thereto. If a wireless key device gets close within a predetermined distance and is recognizable (i.e. is transmitting valid lock access codes), the locking function of the lock 17 is automatically released. If the predetermined time has elapsed, the wireless key device restores the lock 17 to the locked state automatically.

Figure 4:
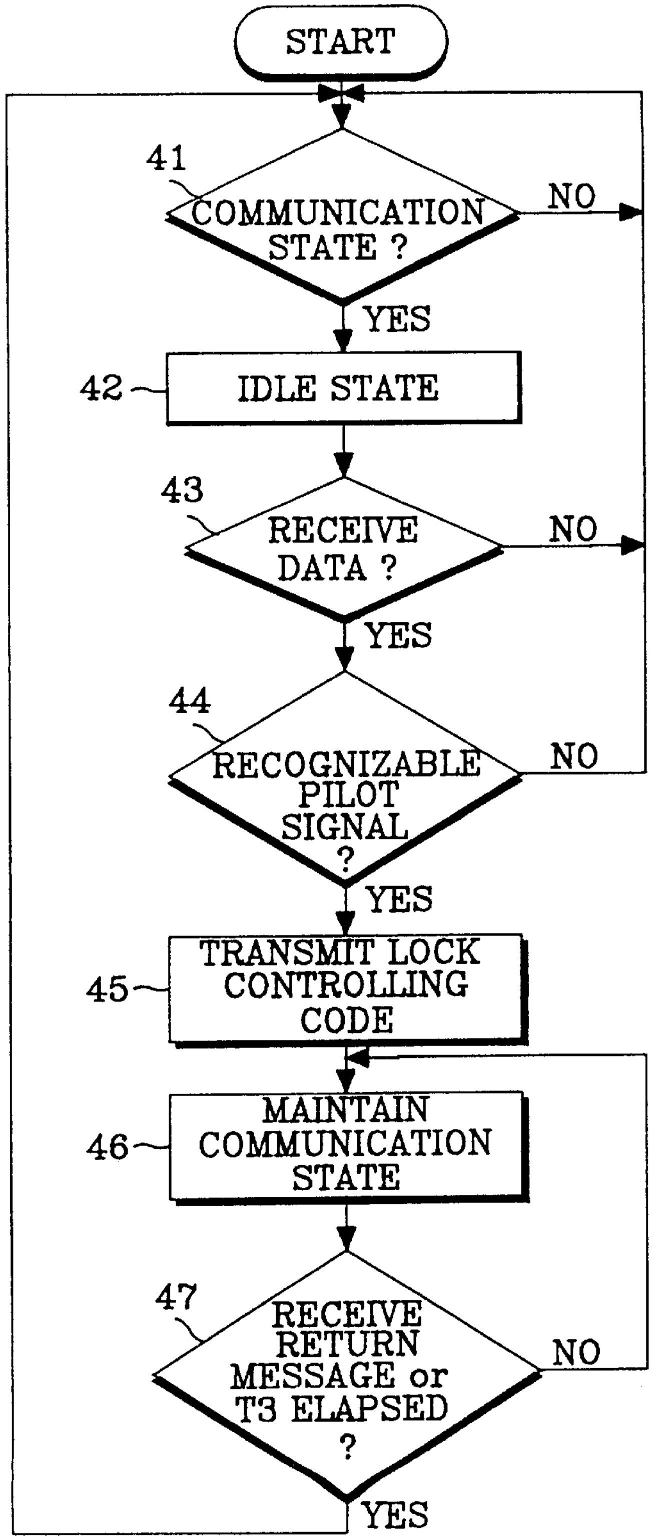
FIG. 4 is a flowchart illustrating the process of controlling an automatic locking or unlocking function of the wireless lock device through wireless communication between the wireless lock device and the wireless key device according to the present invention.

FIG. 4 illustrates an exemplary flowchart of the wireless key device having the illustrative embodiment shown in FIG. 2, in which a controller 21 of the wireless key device checks in step 41 whether the wireless key device is currently in a communication state with a wireless lock device (e.g. receiving a pilot signal). If in the communication state, the process proceeds to step 42. If not, the wireless key device loops to step 41 to wait to be in a communication state. This is for preventing a malfunction in case that the wireless key device gets too close to a wireless lock device so that the wireless key device is positioned for a long time. For example, in case that the wireless lock device is installed at a desk and the wireless key device is positioned near or at the desk, the wireless lock device would keep communicating with the wireless key device, which maintains the lock 17 of the wireless lock device to be open all the time. Therefore, if the communication state is maintained continuously more than a predetermined number, the key controller 21 releases the wireless key device from the communication state.

In step 42, the wireless key device makes a transition to an idle state, in which the wireless key device checks in step 43 whether a pilot signal transmitted from the wireless lock device is received or not. By doing so, the wireless key device determines whether the wireless key device has been positioned within the transmission range of the wireless lock device. In step 43, if the pilot signal is not received, the process returns to step 41. However, if the pilot signal is received in step 43, the key controller 21 checks in step 44 whether the received pilot signal is recognizable (i.e. corresponds to a predetermined pilot code). At this time, if the pilot signal is not recognizable, the process returns to step 41.

If the pilot signal is recognizable in step 44, the key controller 21 accesses the at least one lock access code stored in the memory 22 and outputs the same to the transmitter 24. Then, the transmitter 24 modulates the lock access code to be in a transmissible format and transmits the same to the wireless lock device in step 45. The key controller 21 maintains a communication state with the lock controller 11 in step 46. Then, as described above, the wireless lock device unlocks the lock 17 automatically if the transmitted lock access code matches a stored lock controlling code. Thereafter, the key controller 21 receives the return message to maintain the communication state with the wireless lock device. Otherwise, if a third predetermined time T3 has elapsed after the communication is cut off in the communication state, this is detected in step 47 and the process returns to the step 41.

Therefore, as described above, the wireless lock device continuously transmits the pilot signal in an idle state and the wireless key device transmits the lock controlling code stored therein if the pilot signal is recognizable. If the wireless lock device receives the lock access code when the pilot signal is transmitted, the received lock access code is compared with stored lock controlling codes. If the compared codes match, the lock 17 is automatically controlled to release the locking function thereof. In other words, if the wireless key device gets substantially close to the wireless lock device within a predetermined distance, the wireless key device automatically transmits the lock access code stored therein to attempt to unlock the lock 17. If a predetermined time is elapsed, the wireless lock device sets the lock to a locked state automatically. Therefore, a user can control a locking or unlocking function of a lock without any manual manipulation if the user carries along with the wireless key device.

It is understood that any known wireless signals may be used, such as electromagnetic waves including radio, microwave, or infrared signals, or acoustic waves such as ultrasound.

Therefore, it should be understood that the present invention is not limited to the particular embodiment disclosed herein as the best mode contemplated for carrying out the present invention, and that the present invention is not limited to the specific embodiments described in this specification.

What is claimed is:

1. A locking/unlocking controlling method for a wireless lock device operating in conjunction with a wireless key device, comprising the steps of:

transmitting a pilot signal in an idle state and waiting for reception of a wireless reception signal, including a lock access code;

after reception of said wireless reception signal from said wireless key device, comparing the lock access code with a stored lock controlling code;

releasing the locking function of a lock controlled by said wireless lock device if the lock access code is identical to said lock controlling code and entering a lock released state, and otherwise, returning to said waiting step;

maintaining a communication state with the wireless key device then the locking function of said wireless lock device is released, and maintaining the lock released state of said wireless lock device for a predetermined time; and returning said wireless lock device to a locked state after said predetermined time is elapsed, transmitting a return message to said wireless key device, and returning to said step of transmitting said pilot signal.

2. The method as claimed in claim 1, wherein said predetermined time is set to allow a user to manipulate said lock after said locked state of said wireless lock device is released.

3. In a controlling method of a wireless key device for performing a locking/unlocking operation of a wireless lock device automatically by performing wireless communication with said wireless lock device for transmitting a pilot signal in an idle state and automatically releasing the locked state of a lock when a received lock access code is identical to a stored lock controlling code, an improvement comprising the steps of:

checking whether said wireless lock device is recognizable to the wireless key device when said pilot signal is received in said idle state;

transmitting said lock access code if said wireless lock device is recognizable, and otherwise, returning to said idle state;

maintaining a communication state with the wireless lock device after transmitting said stored lock access code, and returning to said idle state when a locking return message is received from said wireless lock device.

4. A locking/unlocking controlling method of an automatic locking/unlocking device having a wireless lock device and a wireless key device, said method comprising the steps of:

transmitting a pilot signal in an idle state of said wireless lock device and waiting for reception of a wireless reception signal, including a lock access code;

transmitting a stored lock access code when said wireless key device receives said pilot signal;

comparing said lock access code with a stored lock controlling code of said wireless lock device when said wireless lock device receives said lock access code of said wireless key device after said pilot signal transmitting step, releasing a locked state of said wireless lock device if said lock access code of said wireless key device is identical to said stored lock controlling code, and if not, returning to said step of transmitting said pilot signal;

maintaining a communication state with the wireless key device when the locking state of said wireless lock device is released, and maintaining the locking released state of said wireless lock device for a predetermined time;

returning said wireless lock device to a locked state after said predetermined time is elapsed, transmitting a return message to said wireless key device and then returning to said step of transmitting said pilot signal.

5. An automatic locking/unlocking device comprising:

a wireless lock device which includes:

a lock;

a first communications means for transmitting a wireless transmission signal, including a pilot signal, and for receiving a wireless reception signal; and a lock control circuit for generating the pilot signal by controlling said first communication means, for comparing a lock access code of the wireless reception signal with a lock controlling code when the wireless reception signal is received through said first communication means, for releasing a locking function of said lock if the lock access code of the wireless reception signal is identical to the lock controlling code, for locking said lock after a predetermined time has elapsed, and for generating a locking return message after the predetermined time has elapsed; and a wireless key device which includes:

a second communication means for transmitting the wireless reception signal, including the lock access code, to said first communications means of said wireless lock device, and for receiving the wireless transmission signal and the locking return message from said first communications means of said wireless lock device; and a key control circuit for generating the wireless reception signal, including the lock access code, when the pilot signal is received from said wireless lock device;

wherein said wireless lock device substantially continuously outputs the pilot signal in an idle state, the lock access code is automatically transmitted when said wireless key device is positioned to said wireless lock device within a predetermined distance to receive the pilot signal, said wireless key device maintains a communication state with the wireless lock device after transmitting the lock access code, and said wireless key device returns to a second idle state after receiving the locking return message from the wireless lock device.

6. The device of claim 5, wherein said wireless lock device further comprises a first memory for storing the lock controlling code.

7. The device of claim 5, wherein said wireless key device further comprises a second memory for storing the lock access code.

8. The device of claim 5, wherein said first communication means comprises:

a first transmitter for transmitting the wireless transmission signal, including the pilot signal; and a first receiver for receiving the wireless reception signal.

9. The device of claim 8, wherein said second communication means comprises:

a second transmitter for transmitting the wireless reception signal, including the lock access code, to said first receiver of said wireless lock device; and a second receiver for receiving the wireless transmission signal from said first transmitter of said wireless lock device.

10. The device of claim 5, wherein said wireless transmission signal is a radio frequency signal.

11. The device of 5, wherein said wireless transmission signal is an infrared signal.

12. In a controlling method of a wireless key device for performing a locking/unlocking operation of a wireless lock device automatically by performing wireless communication with said wireless lock device for transmitting a pilot signal in a first idle state and automatically releasing the locked state of a lock when a received lock access code is identical to a stored lock controlling code, an improvement comprising the steps of:

checking whether said wireless lock device is recognizable to the wireless key device when said pilot signal is received in a second idle state;

transmitting said lock access code if said wireless lock device is recognizable, and otherwise, returning to said second idle state; and maintaining a communication state with the wireless lock device after transmitting said stored lock access code, and returning to said second idle state when a locking return message is received from said wireless lock device.

* * * * *